United States Patent
Kurian et al.

(10) Patent No.: US 12,086,269 B2
(45) Date of Patent: Sep. 10, 2024

(54) SYSTEM FOR DEPLOYABLE SOFTWARE VULNERABILITY TESTING PLATFORM

(71) Applicant: BANK OF AMERICA CORPORATION, Charlotte, NC (US)

(72) Inventors: Manu Jacob Kurian, Dallas, TX (US); Tomas M. Castrejon, III, Fort Mill, SC (US); Michael Robert Young, Davidson, NC (US); David Nardoni, Sierra Madre, CA (US); Joel Townsend, Spring Church, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 344 days.

(21) Appl. No.: 17/699,443

(22) Filed: Mar. 21, 2022

(65) Prior Publication Data

US 2023/0297689 A1  Sep. 21, 2023

(51) Int. Cl.
  *G06F 21/57* (2013.01)
  *G06F 8/60* (2018.01)
  *G06F 8/65* (2018.01)

(52) U.S. Cl.
  CPC .............. *G06F 21/577* (2013.01); *G06F 8/60* (2013.01); *G06F 8/65* (2013.01); *G06F 2221/033* (2013.01)

(58) Field of Classification Search
  None
  See application file for complete search history.

(56) References Cited

U.S. PATENT DOCUMENTS

| | | |
|---|---|---|
| 7,421,621 B1 | 9/2008 | Zambrana |
| 7,784,099 B2 | 8/2010 | Benjamin |
| 8,806,647 B1 | 8/2014 | Daswani et al. |
| 8,863,288 B1 | 10/2014 | Savage et al. |
| 8,950,005 B1 | 2/2015 | Torney |

(Continued)

OTHER PUBLICATIONS

Torkura KA, et al. Cavas: Neutralizing application and container security vulnerabilities in the cloud native era. InSecurity and Privacy in Communication Networks: 14th International Conference, SecureComm 2018, Singapore, Singapore, Aug. 8-10, 2018, Proceedings, Part I 2018 (Year: 2018).*

(Continued)

*Primary Examiner* — James R Turchen
(74) *Attorney, Agent, or Firm* — Moore & Van Allen PLLC; Anup Shrinivasan Iyer (57) ABSTRACT

Systems, computer program products, and methods are described herein for deployable software vulnerability testing platform. The present invention is configured to receive, from a user input device, an initial request from a user to generate a deployable software vulnerability testing (SVT) engine; prompt an SVT dashboard for display on the user input device to receive one or more input parameters associated with the first vulnerability in response to receiving the initial request; receive, via the SVT dashboard, the one or more input parameters; generate the SVT engine based on at least the one or more input parameters; receive, from the user input device, one or more deployment parameters associated with a deployment of the SVT engine; and deploy the SVT engine within the distributed technology infrastructure to identify the one or more instances of the first vulnerability based on at least the one or more deployment parameters.

18 Claims, 2 Drawing Sheets

(56) References Cited

U.S. PATENT DOCUMENTS

| | | | |
|---|---|---|---|
| 9,454,659 | B1 | 9/2016 | Daymont |
| 9,594,913 | B2 | 3/2017 | Serrano et al. |
| 9,721,212 | B2 | 8/2017 | Gupta et al. |
| 9,781,146 | B2 | 10/2017 | Sridhar |
| 9,824,214 | B2 | 11/2017 | Daymont |
| 9,830,148 | B1 | 11/2017 | Mo |
| 10,459,822 | B1* | 10/2019 | Gondi ................. G06F 8/75 |
| 10,599,852 | B2 | 3/2020 | Daymont |
| 10,783,245 | B2 | 9/2020 | Hassanshahi et al. |
| 10,783,254 | B2 | 9/2020 | Sharma et al. |
| 11,010,191 | B1* | 5/2021 | Hornbeck ............. H04L 67/133 |
| 11,363,055 | B2 | 6/2022 | Bierner et al. |
| 11,740,882 | B2* | 8/2023 | Roy ..................... G06F 9/541 |
| | | | 717/174 |
| 2009/0254993 | A1 | 10/2009 | Leone |
| 2010/0281248 | A1 | 11/2010 | Lockhart et al. |
| 2011/0173693 | A1 | 7/2011 | Wysopal et al. |
| 2013/0067448 | A1* | 3/2013 | Sannidhanam .......... G06F 8/60 |
| | | | 717/169 |
| 2013/0227695 | A1 | 8/2013 | Shankar |
| 2013/0232472 | A1 | 9/2013 | Korner et al. |
| 2013/0290322 | A1 | 10/2013 | Prosnitz et al. |
| 2015/0121533 | A1* | 4/2015 | Gluck ................ G06F 11/3604 |
| | | | 726/25 |
| 2016/0099963 | A1* | 4/2016 | Mahaffey ............. H04L 63/166 |
| | | | 726/25 |
| 2016/0314302 | A1 | 10/2016 | Sabetta et al. |
| 2018/0020021 | A1* | 1/2018 | Gilmore ............. H04L 63/1441 |
| 2019/0124114 | A1* | 4/2019 | Purushothaman .. H04L 63/1433 |
| 2019/0265957 | A1* | 8/2019 | Risbood ................ G06F 9/4492 |
| 2019/0354686 | A1 | 11/2019 | Czaplewski et al. |
| 2022/0083321 | A1* | 3/2022 | Roy ..................... G06F 9/541 |
| 2023/0067084 | A1* | 3/2023 | Mohanty ................ G06F 8/447 |
| 2023/0229420 | A1* | 7/2023 | Paravatha ............ G06F 9/5055 |
| | | | 717/169 |

OTHER PUBLICATIONS

Mai PX, Pastore F, Goknil A, Briand L. Metamorphic security testing for web systems. In2020 IEEE 13th International Conference on Software Testing, Validation and Verification (ICST) Oct. 24, 2020 (pp. 186-197). IEEE. (Year: 2020).*

Torkura KA, Cheng F, Meinel C. A proposed framework for proactive vulnerability assessments in cloud deployments. In2015 10th International Conference for Internet Technology and Secured Transactions (ICITST) Dec. 14, 2015 (pp. 51-57). IEEE. (Year: 2015).*

* cited by examiner

SYSTEM FOR DEPLOYABLE SOFTWARE VULNERABILITY TESTING PLATFORM

FIELD OF THE INVENTION

The present invention embraces a system for deployable software vulnerability testing platform.

BACKGROUND

In larger entities, many third party software applications are employed in the technology infrastructure to process information on a daily basis. Each application is used to execute specific action. Most entities have a record of the type of applications being used within the technology infrastructure. However, entities may not know information at a level of granularity that will allow for identification of specific libraries that are depended upon by the applications to execute actions.

Therefore, there is a need for a deployable software vulnerability testing platform capable of deploying a platform agnostic vulnerability testing engine to identify the vulnerability quickly.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for deployable software vulnerability testing platform is presented. The system comprising: at least one non-transitory storage device; and at least one processor coupled to the at least one non-transitory storage device, wherein the at least one processor is configured to: receive, from a user input device, an initial request from a user to generate a deployable software vulnerability testing (SVT) engine to identify one or more instances of a first vulnerability within a distributed technology infrastructure; prompt an SVT dashboard for display on the user input device to receive one or more input parameters associated with the first vulnerability in response to receiving the initial request; receive, via the SVT dashboard, the one or more input parameters; generate the SVT engine based on at least the one or more input parameters; receive, from the user input device, one or more deployment parameters associated with a deployment of the SVT engine; and deploy the SVT engine within the distributed technology infrastructure to identify the one or more instances of the first vulnerability based on at least the one or more deployment parameters.

In some embodiments, the SVT engine is platform agnostic.

In some embodiments, the at least one processor is further configured to: receive, via the SVT dashboard, the one or more deployment parameters, wherein the one or more deployment parameters comprises at least information associated a first set of applications within the distributed technology infrastructure; and deploy the SVT engine to identify the one or more instances of the first vulnerability within the first set of applications within the distributed technology infrastructure.

In some embodiments, the information associated with the first set of applications comprises at least an application version.

In some embodiments, the at least one processor is further configured to: receive, via the SVT dashboard, the one or more deployment parameters, wherein the one or more deployment parameters comprises at least information associated with one or more software libraries; determine a second set of applications that are associated with the one or more software libraries; and deploy the SVT engine to identify the one or more instances of the first vulnerability within the second set of applications within the distributed technology infrastructure.

In some embodiments, the one or more input parameters comprises at least information associated with the first vulnerability, wherein the information comprises at least one or more known vulnerability signatures associated with the first vulnerability.

In some embodiments, the at least one processor is further configured to: receive, from the user input device, one or more actions to be executed in response to identifying the one or more instances of the first vulnerability within the distributed technology infrastructure; and store the one or more actions in an action repository.

In some embodiments, the one or more actions comprises at least a software patch configured to address the first vulnerability in the one or more instances identified.

In some embodiments, the at least one processor is further configured to: identify the one or more instances of the first vulnerability within the distributed technology infrastructure based on at least deploying the SVT engine within the distributed technology infrastructure; automatically retrieve, from the action repository, the one or more actions in response to identifying the one or more instances of the first vulnerability; and executing the one or more actions on the first vulnerability in the one or more instances identified.

In another aspect, a computer program product for deployable software vulnerability testing platform is presented. The computer program product comprising a non-transitory computer-readable medium comprising code causing a first apparatus to: receive, from a user input device, an initial request from a user to generate a deployable software vulnerability testing (SVT) engine to identify one or more instances of a first vulnerability within a distributed technology infrastructure; prompt an SVT dashboard for display on the user input device to receive one or more input parameters associated with the first vulnerability in response to receiving the initial request; receive, via the SVT dashboard, the one or more input parameters; generate the SVT engine based on at least the one or more input parameters; receive, from the user input device, one or more deployment parameters associated with a deployment of the SVT engine; and deploy the SVT engine within the distributed technology infrastructure to identify the one or more instances of the first vulnerability based on at least the one or more deployment parameters.

In yet another aspect, a method for deployable software vulnerability testing platform is presented. The method comprising: receiving, from a user input device, an initial request from a user to generate a deployable software vulnerability testing (SVT) engine to identify one or more instances of a first vulnerability within a distributed technology infrastructure; prompting an SVT dashboard for display on the user input device to receive one or more input parameters associated with the first vulnerability in response to receiving the initial request; receiving, via the SVT dashboard, the one or more input parameters; generating the SVT engine based on at least the one or more input parameters; receiving, from the user input device, one or more deployment parameters associated with a deployment of the SVT engine; and deploying the SVT engine within the distributed technology infrastructure to identify the one or more instances of the first vulnerability based on at least the one or more deployment parameters.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In larger entities, many third party software applications are employed in the technology infrastructure to process information on a daily basis. Each application is used to execute specific action. Most entities have a record of the type of applications being used within the technology infrastructure. However, entities may not know information at a level of granularity that will allow for identification of specific libraries that are depended upon by the applications to execute actions. It is not uncommon for certain applications to depend on third party libraries to perform specific actions. During ingestion of a new technology (e.g., application), most entities do not itemize the list of libraries associated with that technology. Entities often employ security tools to monitor the technology infrastructure for vulnerabilities. While most security tools identify vulnerabilities with a specific software, they do not have the capability to identify library-level vulnerabilities in the software.

This present invention proposes a platform (e.g., operating system) agnostic deployable vulnerability testing engine that may be configured to identify a particular vulnerability in applications across the technology infrastructure. To configure the engine to identify the particular vulnerability, the concept proposes defining a set of vectors. The vectors may define where to look, what to look for, and what to do when the vulnerability is found. In one example, the vulnerability may have been identified by the entity in a particular library (e.g., Log4j) that is used in many software applications across the technology infrastructure. In cases where the entity does not know the specific applications that depend on that library for operation, the vectors may be used to define the specific library where the vulnerability was found, version of the application with that library, unique signature of the vulnerability, and actions to execute if the vulnerability is identified. In some embodiments, the present invention allows for deployment of a number of such engines on short notice to identify the vulnerability quickly instead of having to depend on the developers of the third party vulnerability tool to update the vectors to identify the vulnerability.

Figure 1:
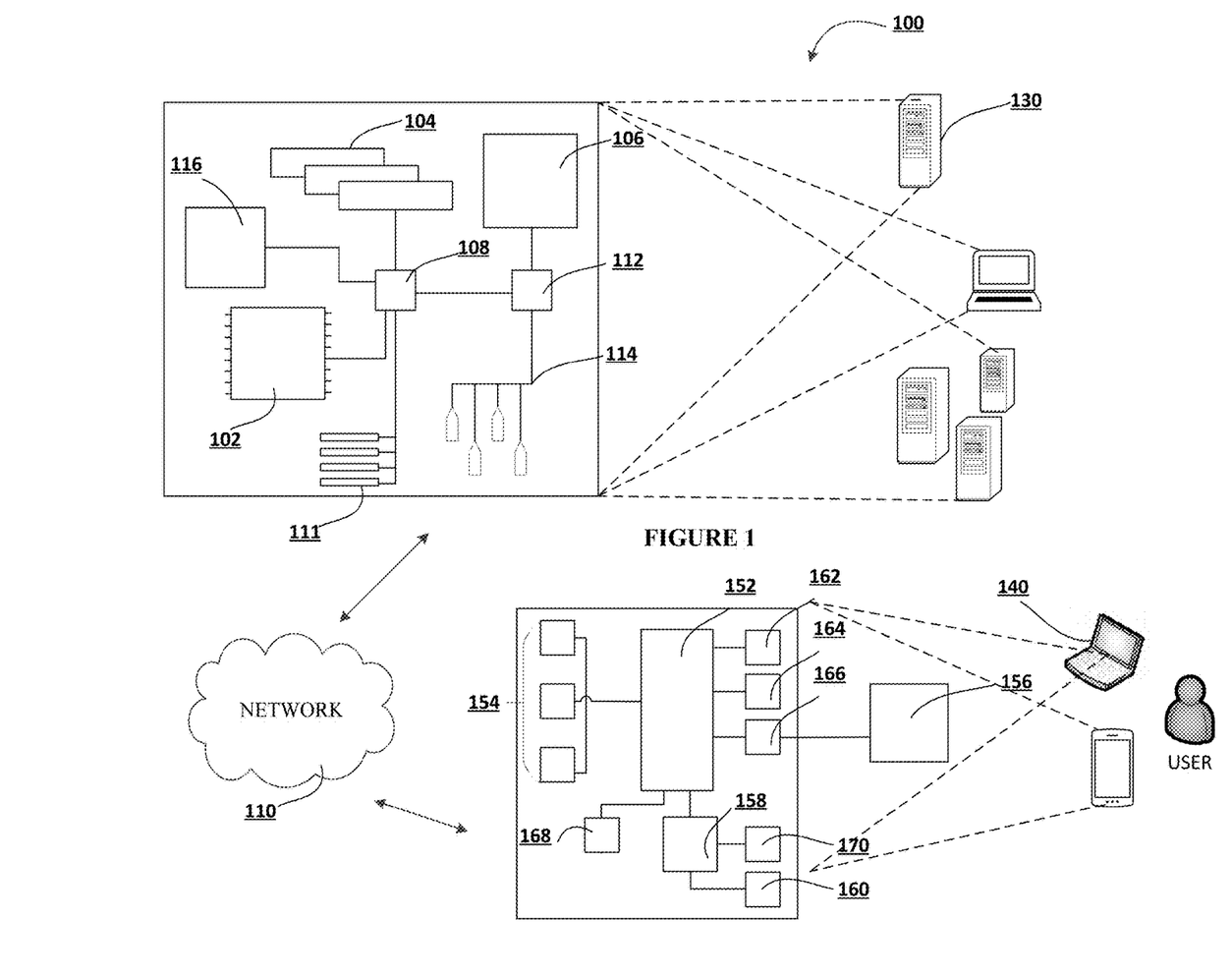
FIG. 1 illustrates technical components of a system for deployable software vulnerability testing platform, in accordance with an embodiment of the invention.

FIG. 1 illustrates technical components of a system for deployable software vulnerability testing platform 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices (e.g., automated teller machine devices), blade servers, mainframes, or any combination of the aforementioned. In accordance with embodiments of the invention, the user input device 140 is intended to represent various forms of mobile devices, such as personal digital assistants, cellular telephones, smartphones, augmented reality (AR) devices, virtual reality (VR) devices, extended reality (XR) devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 as part of an application that may perform the functions disclosed herein, display graphical information for a GUI on an external input/output device, such as display 116 coupled to a high-speed interface 108, and/or the like. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154, which in one embodiment includes the instructions of an application that may perform the functions disclosed herein. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

Vulnerability testing is an assessment used to evaluate application security by identifying, diagnosing, and triaging application vulnerabilities. Vulnerability testing tools are useful for testing for known vulnerabilities. Typically, most entities employ some form of third party vulnerability testing tools to protect their technology infrastructure. These include, static application security analysis, dynamic application security analysis, penetration testing, image scanners, configuration reviews, and/or the like. However, in cases where a previously unseen vulnerability is to be identified across the technology infrastructure, the capabilities of these third party tools may be limited.

There present invention provides the functional benefit of quickly deploying a platform agnostic targeted software vulnerability testing (SVT) engine that can identify components (e.g., software libraries, applications, or the like) that are affected by the specific vulnerabilities.

Figure 2:
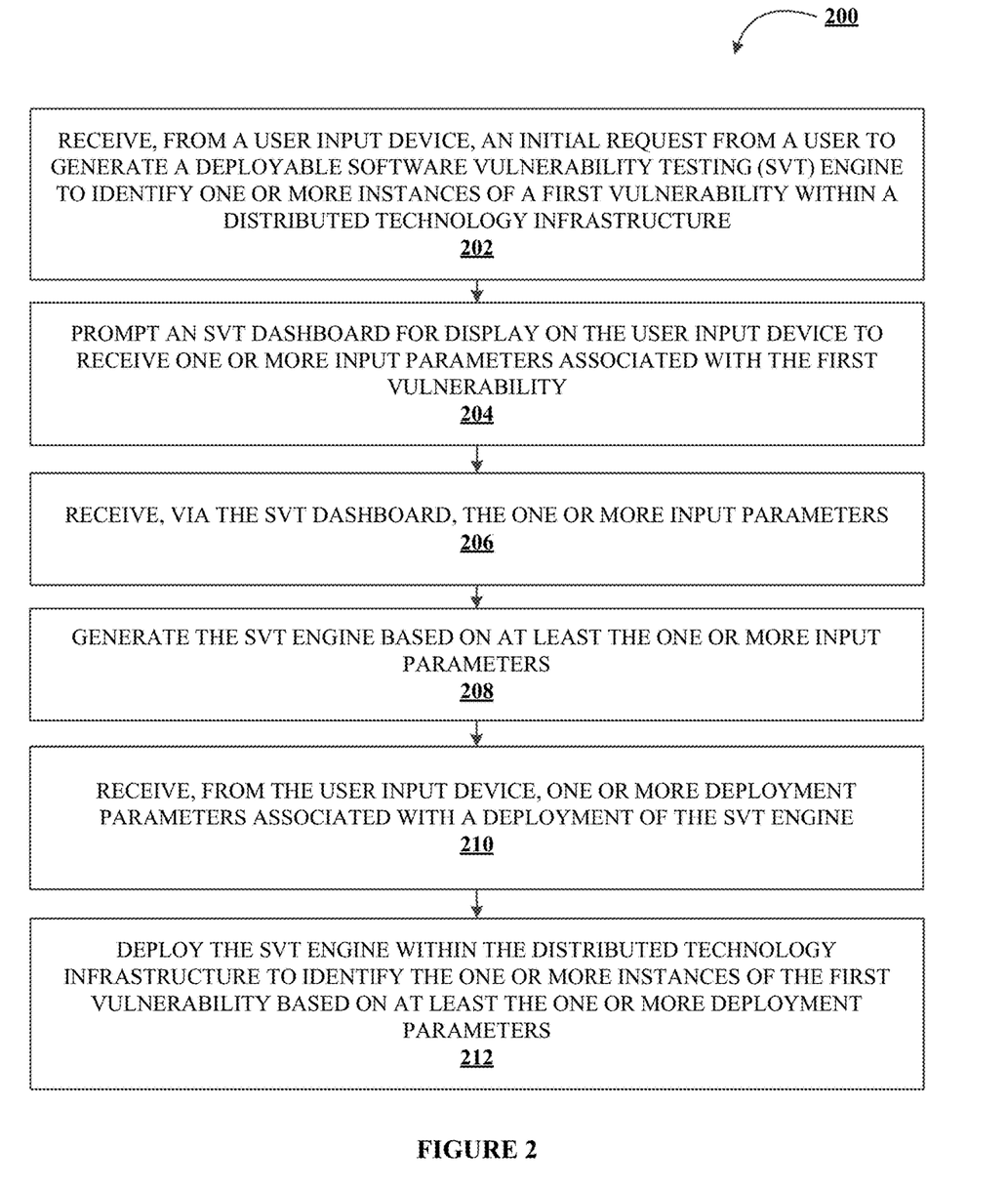
FIG. 2 illustrates a process flow for deployable software vulnerability testing platform, in accordance with an embodiment of the invention.

FIG. 2 illustrates a process flow for deployable software vulnerability testing platform 200, in accordance with an embodiment of the invention. As shown in block 202, the process flow includes receiving, from a user input device, an initial request from a user to generate a deployable software vulnerability testing (SVT) engine to identify one or more instances of a first vulnerability within a distributed technology infrastructure (e.g., operating system, open ports, installed software, user accounts, file system structure, system configurations, and more). In some embodiments, the first vulnerability may be a software code flaw or a system misconfiguration through which malicious actors can directly gain unauthorized access to a system or network. Once inside, these malicious actors can leverage authorizations and privileges to compromise systems and resources. In some other embodiments, the first vulnerability may be a means through which malicious actors use a vulnerability to mount a misappropriate action. In such cases, the first vulnerability may be a piece of specially crafted software or a sequence of commands. In some other embodiments, the first vulnerability may be a set of conditions that are present for a potential misappropriate action. Examples of vulnerabilities include broken authentication, code injection, cross-site scripting, security misconfiguration, and/or the like.

Next, as shown in block 204, the process flow includes prompting an SVT dashboard for display on the user input device to receive one or more input parameters associated with the first vulnerability in response to receiving the initial request. Next, as shown in block 206, the process flow includes receiving, via the SVT dashboard, the one or more input parameters. In some embodiments, the one or more input parameters may include vulnerability identification vectors (e.g., vulnerability signatures) that are used to identify a particular vulnerability. In one aspect, the one or more input parameters may include a formalized representation (e.g., regular expression) of the vulnerability language. In other words, the input parameters may include information associated with the first vulnerability, such as known vulnerability signatures associated with the first vulnerability.

Next, as shown in block 208, the process flow includes generating the SVT engine based on at least the one or more input parameters. In some embodiments, the SVT engine may be self-contained, but externally-controllable code that encapsulates powerful logic designed to perform or execute instructions to scan the distributed technology infrastructure, including operating systems, open ports, installed software, user accounts, file system structure, system configurations, and/or the like to identify the first vulnerability. As described herein, the SVT engine may be platform agnostic, i.e., capable of running on any combination or operating system and underlying processor architecture.

Next, as shown in block 210, the process flow includes receiving, from the user input device, one or more deployment parameters associated with a deployment of the SVT engine. Next, as shown in block 212, the process flow includes deploying the SVT engine within the distributed technology infrastructure to identify the one or more instances of the first vulnerability based on at least the one or more deployment parameters.

In some embodiments, the deployment parameters may specify a first set of applications within the distributed technology infrastructure for the SVT engine to be deployed to identify instances of the first vulnerability. In this regard, the system may be configured to receive information associated a first set of applications. In one aspect, the information associated with the first set of applications may include at least an application version. In response, the system may be configured to deploy the SVT engine to identify the one or more instances of the first vulnerability within the first set of applications within the distributed technology infrastructure.

In some embodiments, the deployment parameters may specify particular software libraries within the distributed technology infrastructure for the SVT engine to be deployed to identify instances of the first vulnerability. In this regard, the system may be configured to receive information associated with one or more software libraries. In response, the system may be configured to determine a second set of applications that are associated with the one or more software libraries. Having determined the second set of applications, the system may be configured to deploy the SVT engine to identify instances of the first vulnerability within the second set of applications within the distributed technology infrastructure.

In some embodiments, the system may be configured to receive, from the user input device, a number of mitigation actions to be executed in response to identifying specific vulnerabilities. These actions are then stored in a repository and accessible when necessary. In some embodiments, these actions may include a software patch that is configured to address the identified vulnerability in all the identified instances. Accordingly, the system may be configured to identify the one or more instances of the first vulnerability within the distributed technology infrastructure based on at least deploying the SVT engine within the distributed technology infrastructure. In response, the system may be configured to automatically retrieve, from the action repository, the one or more actions in response to identifying the one or more instances of the first vulnerability. Once retrieved, the system may be configured to execute the one or more actions on the first vulnerability in the one or more instances identified.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for deployable software vulnerability testing platform, the system comprising:
   at least one processor; and
   at least one non-transitory storage device containing instructions that, when executed by the at least one processor, cause the at least one processor to:
   receive, from a user input device, an initial request from a user to generate a deployable software vulnerability testing (SVT) engine to identify one or more instances of a first vulnerability within a distributed technology infrastructure;
   prompt an SVT dashboard for display on the user input device to receive one or more input parameters associated with the first vulnerability in response to receiving the initial request;
   receive, via the SVT dashboard, the one or more input parameters;
   generate the SVT engine based on at least the one or more input parameters;
   receive, from the user input device, one or more deployment parameters associated with a deployment of the SVT engine;
   deploy the SVT engine within the distributed technology infrastructure to identify the one or more instances of the first vulnerability based on at least the one or more deployment parameters;
   receive, from the user input device, one or more actions to be executed in response to identifying the one or more instances of the first vulnerability within the distributed technology infrastructure;
   store the one or more actions in an action repository;
   identify the one or more instances of the first vulnerability within the distributed technology infrastructure based on at least deploying the SVT engine within the distributed technology infrastructure;
   automatically retrieve, from the action repository, the one or more actions in response to identifying the one or more instances of the first vulnerability; and
   execute the one or more actions on the first vulnerability in the one or more instances identified.

2. The system of claim 1, wherein the SVT engine is platform agnostic.

3. The system of claim 1, wherein the instructions, when executed, further cause the at least one processor to:
   receive, via the SVT dashboard, the one or more deployment parameters, wherein the one or more deployment parameters comprises at least information associated a first set of applications within the distributed technology infrastructure; and
   deploy the SVT engine to identify the one or more instances of the first vulnerability within the first set of applications within the distributed technology infrastructure.

4. The system of claim 3, wherein the information associated with the first set of applications comprises at least an application version.

5. The system of claim 1, wherein the instructions, when executed, further cause the at least one processor to:
   receive, via the SVT dashboard, the one or more deployment parameters, wherein the one or more deployment parameters comprises at least information associated with one or more software libraries;
   determine a second set of applications that are associated with the one or more software libraries; and
   deploy the SVT engine to identify the one or more instances of the first vulnerability within the second set of applications within the distributed technology infrastructure.

6. The system of claim 1, wherein the one or more input parameters comprises at least information associated with the first vulnerability, wherein the information comprises at least one or more known vulnerability signatures associated with the first vulnerability.

7. The system of claim 1, wherein the one or more actions comprises at least a software patch configured to address the first vulnerability in the one or more instances identified.

8. A computer program product for deployable software vulnerability testing platform, the computer program product comprising a non-transitory computer-readable medium comprising code causing a first apparatus to:
   receive, from a user input device, an initial request from a user to generate a deployable software vulnerability testing (SVT) engine to identify one or more instances of a first vulnerability within a distributed technology infrastructure;
   prompt an SVT dashboard for display on the user input device to receive one or more input parameters associated with the first vulnerability in response to receiving the initial request;
   receive, from the user input device, one or more deployment parameters associated with a deployment of the SVT engine;
   deploy the SVT engine within the distributed technology infrastructure to identify the one or more instances of the first vulnerability based on at least the one or more deployment parameters;
   receive, from the user input device, one or more actions to be executed in response to identifying the one or more instances of the first vulnerability within the distributed technology infrastructure;
   store the one or more actions in an action repository;
   identify the one or more instances of the first vulnerability within the distributed technology infrastructure based on at least deploying the SVT engine within the distributed technology infrastructure;
   automatically retrieve, from the action repository, the one or more actions in response to identifying the one or more instances of the first vulnerability; and
   execute the one or more actions on the first vulnerability in the one or more instances identified.

9. The computer program product of claim 8, wherein the SVT engine is platform agnostic.

10. The computer program product of claim 8, wherein the code further causes the first apparatus to:
    receive, via the SVT dashboard, the one or more deployment parameters, wherein the one or more deployment parameters comprises at least information associated a first set of applications within the distributed technology infrastructure; and
    deploy the SVT engine to identify the one or more instances of the first vulnerability within the first set of applications within the distributed technology infrastructure.

11. The computer program product of claim 10, wherein the information associated with the first set of applications comprises at least an application version.

12. The computer program product of claim 8, wherein the code further causes the first apparatus to:
    receive, via the SVT dashboard, the one or more deployment parameters, wherein the one or more deployment parameters comprises at least information associated with one or more software libraries;
determine a second set of applications that are associated with the one or more software libraries; and
deploy the SVT engine to identify the one or more instances of the first vulnerability within the second set of applications within the distributed technology infrastructure.

13. The computer program product of claim 8, wherein the one or more input parameters comprises at least information associated with the first vulnerability, wherein the information comprises at least one or more known vulnerability signatures associated with the first vulnerability.

14. The computer program product of claim 8, wherein the one or more actions comprises at least a software patch configured to address the first vulnerability in the one or more instances identified.

15. A method for deployable software vulnerability testing platform, the method comprising:
receiving, from a user input device, an initial request from a user to generate a deployable software vulnerability testing (SVT) engine to identify one or more instances of a first vulnerability within a distributed technology infrastructure;
prompting an SVT dashboard for display on the user input device to receive one or more input parameters associated with the first vulnerability in response to receiving the initial request;
receiving, from the user input device, one or more deployment parameters associated with a deployment of the SVT engine;
deploying the SVT engine within the distributed technology infrastructure to identify the one or more instances of the first vulnerability based on at least the one or more deployment parameters;
receiving, from the user input device, one or more actions to be executed in response to identifying the one or more instances of the first vulnerability within the distributed technology infrastructure;
storing the one or more actions in an action repository;
identifying the one or more instances of the first vulnerability within the distributed technology infrastructure based on at least deploying the SVT engine within the distributed technology infrastructure;
automatically retrieving, from the action repository, the one or more actions in response to identifying the one or more instances of the first vulnerability; and
executing the one or more actions on the first vulnerability in the one or more instances identified.

16. The method of claim 15, wherein the SVT engine is platform agnostic.

17. The method of claim 15, further comprising:
receiving, via the SVT dashboard, the one or more deployment parameters, wherein the one or more deployment parameters comprises at least information associated a first set of applications within the distributed technology infrastructure; and
deploying the SVT engine to identify the one or more instances of the first vulnerability within the first set of applications within the distributed technology infrastructure.

18. The method of claim 17, wherein the information associated with the first set of applications comprises at least an application version.

* * * * *